United States Patent
Jung et al.

(10) Patent No.: US 7,348,837 B2
(45) Date of Patent: Mar. 25, 2008

(54) POINT DIFFUSION SIGNAL DISTRIBUTION WITH MINIMIZED POWER CONSUMPTION AND SIGNAL SKEW

(75) Inventors: Gun-Ok Jung, Suwon-Si (KR); Young-Min Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 11/297,004

(22) Filed: Dec. 8, 2005

(65) Prior Publication Data

US 2006/0125542 A1 Jun. 15, 2006

(30) Foreign Application Priority Data

Dec. 13, 2004 (KR) .................. 10-2004-0104946

(51) Int. Cl.
*H01L 25/00* (2006.01)
(52) U.S. Cl. ...................... 327/565; 327/293
(58) Field of Classification Search ................ None
See application file for complete search history.

(56) References Cited

U.S. PATENT DOCUMENTS

| | | | |
|---|---|---|---|
| 6,260,181 B1 * | 7/2001 | Inoue ........................ 716/10 |
| 6,522,186 B2 | 2/2003 | O'Mahony et al. ......... 327/295 |
| 7,020,002 B2 * | 3/2006 | Yamamoto .................... 365/63 |
| 7,120,891 B2 * | 10/2006 | Yamamoto .................... 716/12 |
| 7,145,408 B2 * | 12/2006 | Shepard et al. ......... 331/117 D |
| 7,178,124 B1 * | 2/2007 | Makarov et al. .............. 716/12 |
| 2003/0001652 A1 | 1/2003 | O'Mahony et al. |
| 2004/0017242 A1 | 1/2004 | Lee |

OTHER PUBLICATIONS

Korean Patent Application No. 10-1997-0070673 to Cho, having Publication date of Jul. 5, 1999 (w/ English Abstract page).
Japanese Patent Application No. 2001-023418 to Naffziger et al. (w/ English Abstract page).
Japanese Patent No. JP2093917 to Toshio (w/ English Abstract page), Apr. 4, 1990.
"Matching-Based Methods for High-Performance Clock Routing" to Cong et al., IEEE Transactions on Computer-Aided Design of Integrated Circuits and Systems, vol. 12, No. 8, Aug. 1993.

* cited by examiner

*Primary Examiner*—Cassandra Cox
(74) *Attorney, Agent, or Firm*—Monica H. Choi

(57) ABSTRACT

For distributing a signal to loads in an area, the area is divided into a plurality of regions. A respective signal point is disposed in each region for providing the signal to a load in the region. A respective diffusion point is disposed between any two neighboring signal points. The signal is initially applied to a center point of the signal and diffusion points. The signal when received at a given signal or diffusion point is transmitted to any of the signal or diffusion points within a maximum distance from the given signal or diffusion point.

18 Claims, 6 Drawing Sheets

FIG. 1 (PRIOR ART)

DRIVER CONFIGURATION

| Load style | Conditions | Dealy (ps) | Max Skew (ps) | Avg Pwr (mW) |
|---|---|---|---|---|
| | 1.05V, 125C, SS | 452 | 0.7 | 9.6 |
| Balanced | 1.2V, 25C, NN | 268 | 0.3 | 12.9 |
| | 1.35V, -55C, FF | 176 | 0.2 | 17.7 |
| | 1.05V, 125C, SS | 457 | 7.7 | 9.6 |
| Unbalanced | 1.2V, 25C, NN | 270 | 4.6 | 12.8 |
| | 1.35V, -55C, FF | 178 | 3.2 | 17.8 |

POINT DIFFUSION SIGNAL DISTRIBUTION WITH MINIMIZED POWER CONSUMPTION AND SIGNAL SKEW

BACKGROUND OF THE INVENTION

This application claims priority to Korean Patent Application No. 2004-104946, filed on Dec. 13, 2004, in the Korean Intellectual Property Office, the disclosure of which is incorporated herein in its entirety by reference.

1. Field of the Invention

The present invention relates generally to signal distribution, and more particularly to point diffusion signal distribution with minimized power consumption and minimized signal skew.

2. Description of the Related Art

The present invention is described for distribution of a clock signal in an integrated circuit. However, the present invention may be applied for distribution of other types of signals in other types of applications.

Figure 1:
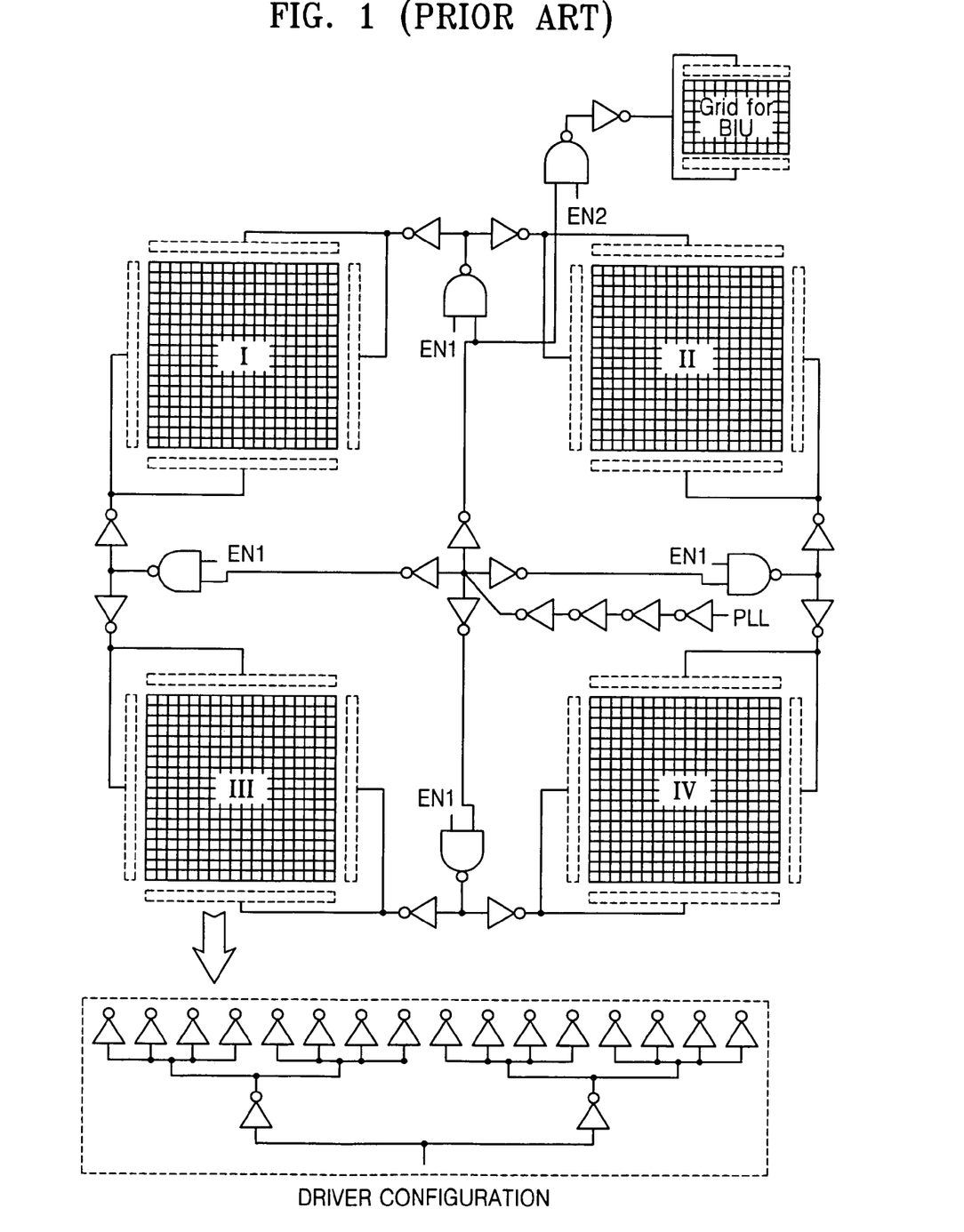
FIG. 1 illustrates a conventional mesh type clock distribution system.

FIG. 1 illustrates a conventional mesh type clock distribution network. In the mesh type clock distribution network of FIG. 1, loads using a clock signal are divided into four groups I, II, III and IV in a grid. Each group is provided with the clock signal through drivers (blocks indicated by dotted lines) surrounding them. Each driver generally includes a plurality of inverters. The clock signal is supplied to the groups I, II, III and IV via the drivers, commonly and simultaneously.

The mesh type clock distribution network has little skew in the clock signal, even when the loads are not uniformly arranged. Furthermore, the mesh type clock distribution network is suitable for a high-speed system because of being able to control the rise time and the fall time of the clock signal. Because the characteristics of the clock signal are not easily changed even with variation in the process of manufacturing the network, the network does not exhibit coupling between lines transmitting the clock signal or a transmission line effect.

Although the conventional mesh type clock distribution network has many benefits, power consumption is excessively high in the conventional mesh type clock distribution network.

Figure 2:
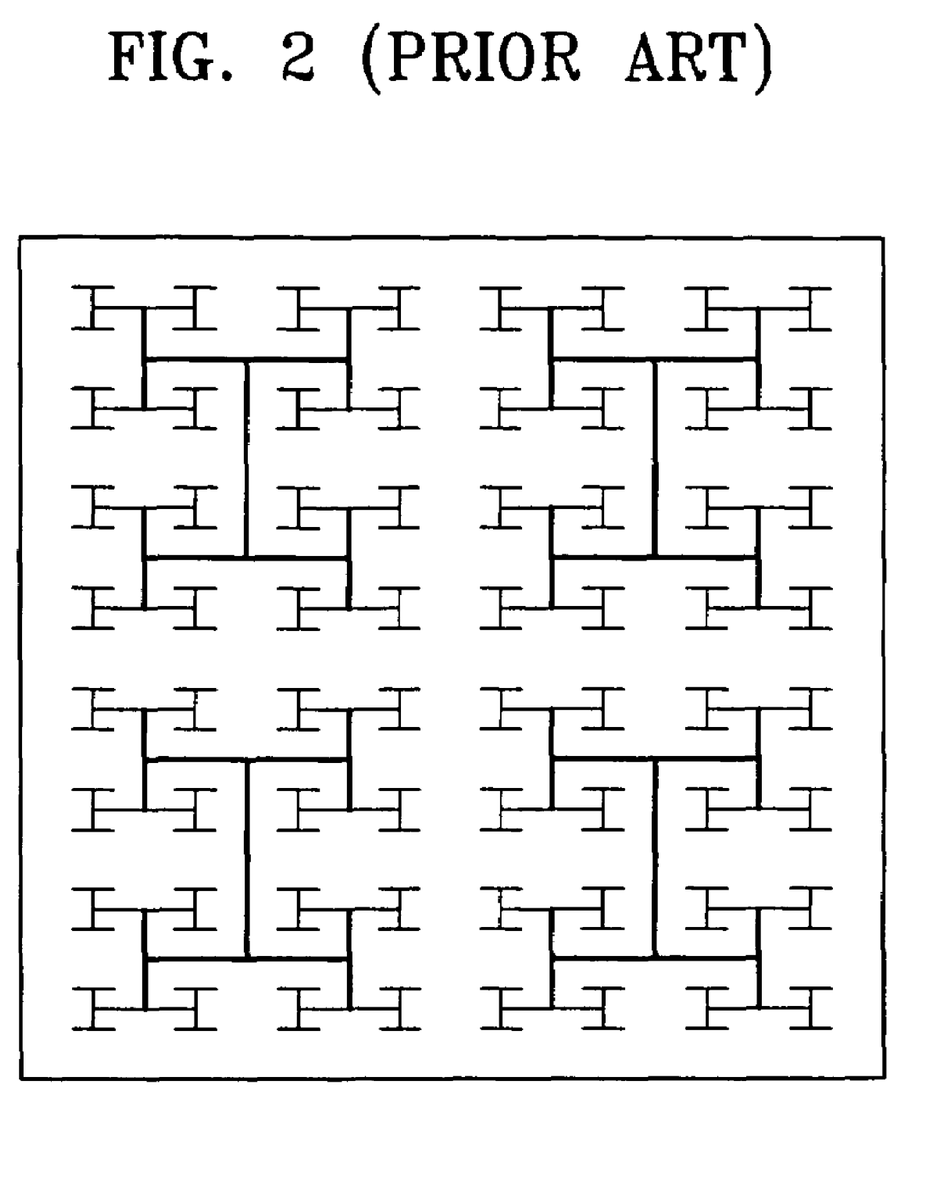
FIG. 2 illustrates a conventional H type clock tree network.

FIG. 2 illustrates a conventional H type clock tree network. Referring to FIG. 2, the H type clock tree network includes four H forms (outlined in bold lines), each starting from one respective point on a chip. In addition, further H type tree structures are formed from each end point of the four H forms.

The H type clock tree network of FIG. 2 has relatively low power consumption because current is provided through a smaller number of starting points. However, the characteristic of the H type clock tree network varies severely with pressure, temperature, and voltage applied to the network. Furthermore, the loads for constructing the H type clock tree network are difficult to arrange, and the network is vulnerable to the transmission line effect.

Figure 3A:
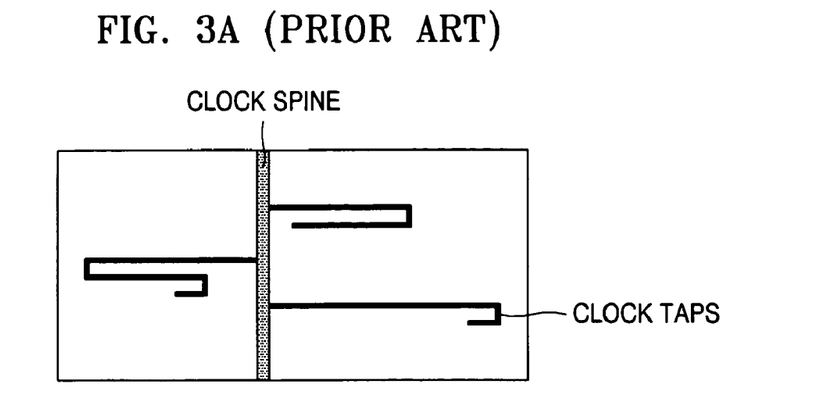
FIG. 3A illustrates a conventional serpentine network.
Figure 3B:
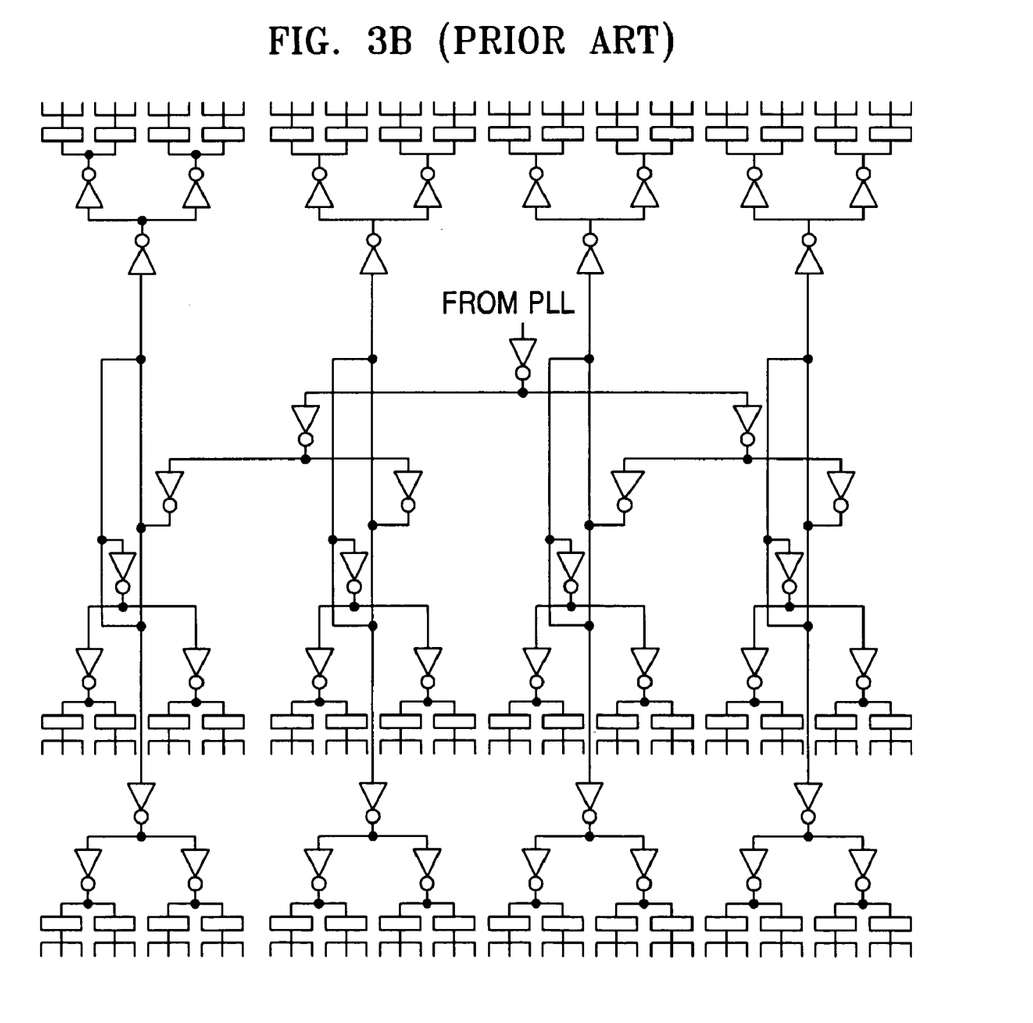
FIG. 3B illustrates an embodiment of the serpentine network of FIG. 3A, according to the prior art.

FIG. 3A illustrates a conventional serpentine network, and FIG. 3B illustrates an embodiment of the serpentine network. Referring to FIGS. 3A and 3B, the serpentine network provides a clock signal to loads in a serpentine form through a plurality of basic transmission lines (outlined in bold lines) extending from a clock supply source such as a PLL (Phase Locked Loop).

The serpentine network has relatively low power consumption because current is provided through a smaller number of starting points. However, the characteristics of the serpentine network vary severely with pressure, temperature, and applied voltage. Furthermore, the loads for constructing the serpentine network are difficult to arrange, and the serpentine network is vulnerable to the transmission line effect.

Thus, a clock distribution system is desired for high speed performance and with low power consumption.

SUMMARY OF THE INVENTION

A point diffusion signal distribution system of embodiments of the present invention has reduced power consumption power while enabling high speed performance.

In a point diffusion signal distribution system for distributing a signal to loads in an area according to an aspect of the present invention, the area is divided into a plurality of regions. A respective signal point is disposed in each of the regions for providing the signal to a load in each region. A respective diffusion point is disposed between any two neighboring signal points. The signal is initially applied to a center point of the signal and diffusion points. The signal when received at a given signal or diffusion point is transmitted to any of the signal or diffusion points within a maximum distance from the given signal or diffusion point.

In one embodiment of the present invention, the signal when received at a given signal or diffusion point is transmitted to any of the signal or diffusion points that has not yet received the signal and that is within the maximum distance from the given signal or diffusion point.

In an example embodiment of the present invention, the signal is a clock signal, and the area is within an integrated circuit for receiving the clock signal.

In another embodiment of the present invention, the respective signal point is disposed at substantially a center of each region. In addition, the respective diffusion point is disposed substantially at a mid-point between any two neighboring signal points.

In a further embodiment of the present invention, the center point is a diffusion point when the number of regions is an even number. Alternatively, the center point is a signal point when the number of regions is an odd number.

In another embodiment of the present invention, the signal when received at a given signal or diffusion point is transmitted to any of the signal or diffusion points having a predetermined same distance from the given signal or diffusion point.

In a further embodiment of the present invention, the area is divided into a plurality of sub-areas. In that case, the signal is initially applied to a respective center point of the signal and diffusion points in each of the sub-areas.

In this manner, the signal is distributed quickly to the loads for high speed operation. In addition, the signal is distributed from a center point via a small number of short transmission lines for reduced power consumption.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3A, 3B, 4, 5, 6, 7, 8, 9, and 10 refer to elements having similar structure and/or function.

DETAILED DESCRIPTION OF THE INVENTION

The present invention is described for distribution of a clock signal in an area of an integrated circuit. However, the present invention may be applied for distribution of other types of signals in other types of applications.

Figure 4:
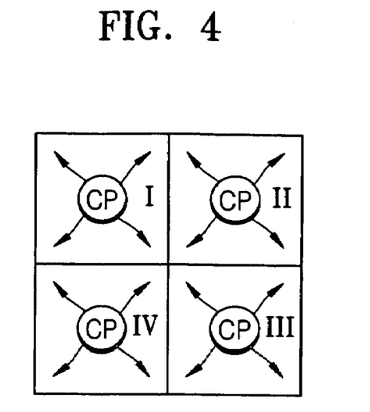
FIG. 4 illustrates dividing a clock system into four regions, according to an embodiment of the present invention.
Figure 5:
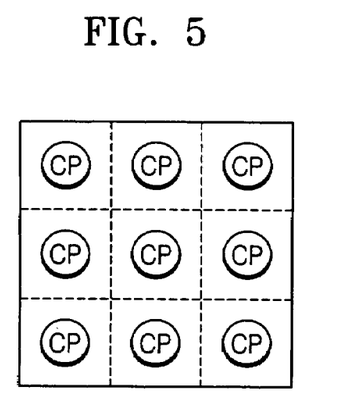
FIG. 5 illustrates dividing a clock system into nine regions, according to an embodiment of the present invention.
Figure 6:
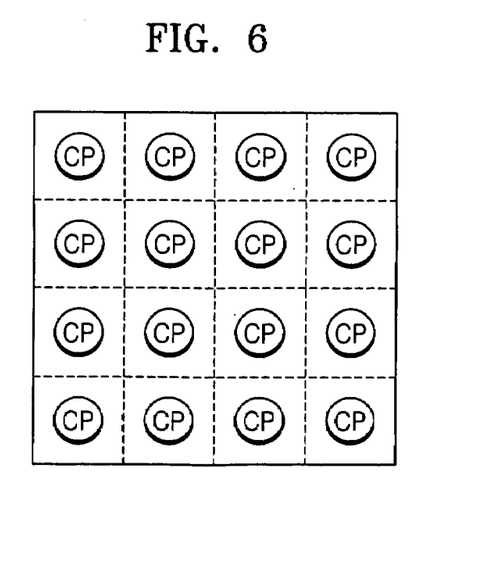
FIG. 6 illustrates dividing a clock system into sixteen regions, according to an embodiment of the present invention.

FIGS. 4, 5, and 6 each show an area having loads for receiving a signal, such as a clock signal. For example, the area in each of FIGS. 4, 5, and 6 may be within an integrated circuit for receiving the clock signal.

Each area in FIGS. 4, 5, and 6 is divided into a plurality of regions in a point diffusion signal distribution system according to an embodiment of the present invention. The area of FIG. 4 is divided into four regions, the area in FIG. 5 is divided into nine regions, and the area in FIG. 6 is divided into sixteen regions.

Referring to FIGS. 4, 5 and 6, dotted lines correspond to the boundaries of the divided regions. Though the dotted lines are drawn straight, they are not limited to straight lines.

Further referring to FIGS. 4, 5 and 6, each region has a respective clock (i.e., signal) point (labeled CP) disposed therein. In one example embodiment of the present invention, the respective clock (i.e., signal) point is disposed substantially at a center of each of the divided regions. A clock signal received at each clock point CP is further applied to any load within the respective region.

Figure 7:
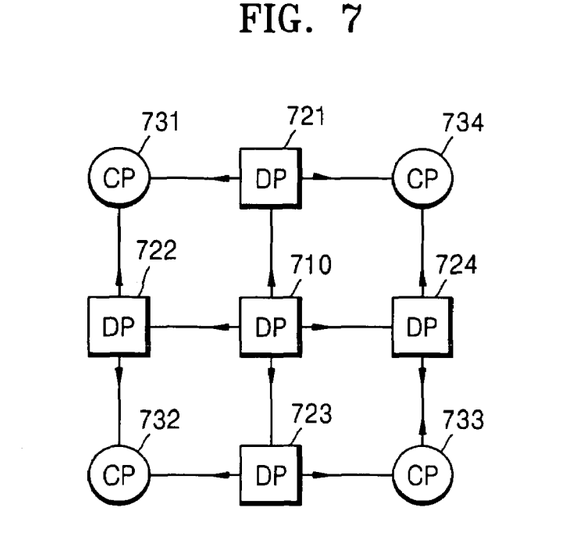
FIG. 7 illustrates a point diffusion signal distribution system for the clock system divided into four regions, according to an embodiment of the present invention.

FIG. 7 shows a point diffusion signal distribution system formed with the clock points for the area of FIG. 4 divided into four regions. For clarity and simplification of illustration and description, the border of the area and the dotted lines outlining the divided regions are omitted in FIG. 7. In FIG. 7, CP denotes a clock point, and DP denotes a diffusion point.

Referring to FIG. 7, note that a diffusion point DP is placed between any two neighboring clock points. Two neighboring clock points herein are defined as the two clock points not having any other intervening clock points though a line defined by (i.e., drawn through) such two clock points. In one example embodiment of the present invention, a respective diffusion point DP is disposed substantially at a mid-point between any two neighboring clock points.

Further referring to FIG. 7, a master clock signal supplied from an external device is initially applied at a center point of the clock points CP and the diffusion points DP. In the embodiment of the FIG. 7, the center point is a first diffusion point 710 disposed substantially at the center of the area of FIG. 7.

In one embodiment of the present invention, each of the clock or diffusion points is implemented as a respective buffer capable of receiving and then transmitting the received clock signal. Subsequently, the clock signal is transmitted from any given clock or diffusion point when that given clock or diffusion point receives the clock signal. In one embodiment of the present invention, the given clock or diffusion point transmits the received clock signal to any of the other clock or diffusion points that has not yet received the clock signal and that is also within a maximum distance from that given clock or diffusion point.

Figure 8:
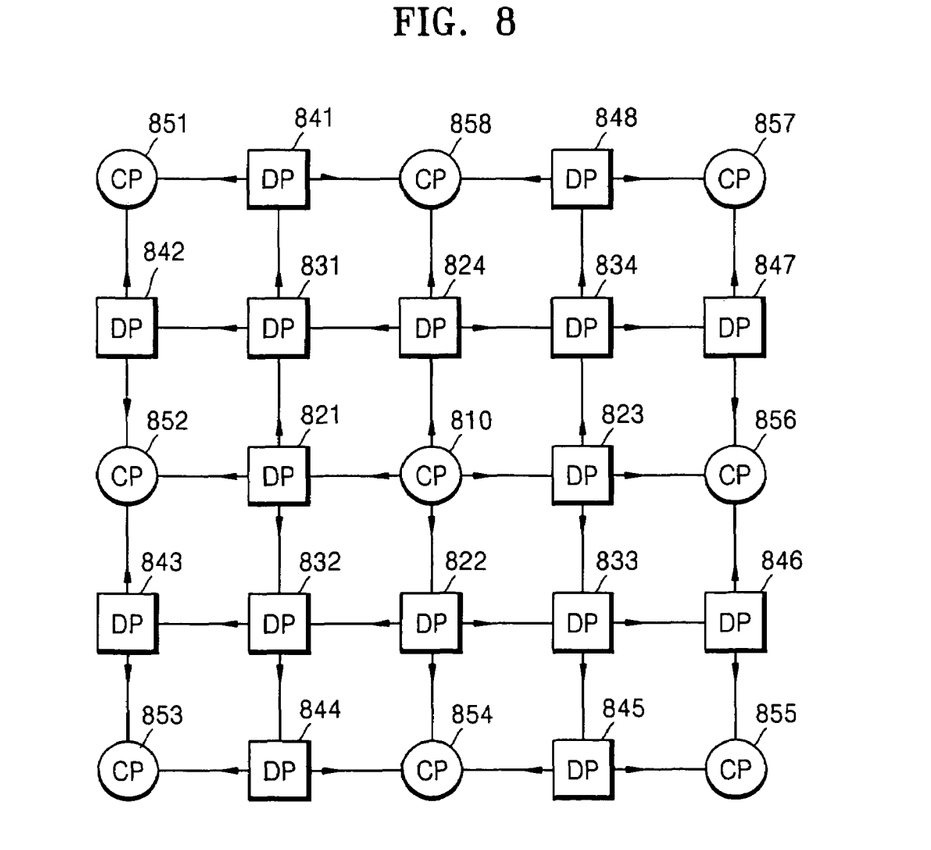
FIG. 8 illustrates a point diffusion signal distribution system for the clock system divided into nine regions, according to the embodiment of the present invention.

In the example of FIG. 7, the center diffusion point 710 transmits the clock signal to second diffusion points 721, 722, 723 and 724 via the arrowed transmission paths. Each arrowed transmission path in FIGS. 7 and 8 represents a transmission line such as a metal line in one embodiment of the present invention. In one embodiment of the present invention, each arrowed transmission line in FIG. 7 has a substantially same predetermined length.

Thereafter, each of the second diffusion points 721, 722, 723 and 724 transmits the clock signal in two directions to a respective set of two of the four clock points 731, 732, 733 and 734, as illustrated in FIG. 7. Each of the diffusion points 721, 722, 723 and 724 simply buffers and transmits the received clock signal to another diffusion or clock point. Each of the clock points 731, 732, 733, and 734 also buffers the received clock signal that is then transmitted to any load within the respective region.

FIG. 8 shows a point diffusion signal distribution system formed with the clock points for the area of FIG. 5 divided into nine regions. Referring to FIG. 8, a master clock signal supplied from an external device is initially applied at a center clock point 810 disposed substantially at the center of the area of FIG. 8. Referring to FIGS. 4, 5, 7, and 8, note that the center point having the clock signal initially applied thereon is a diffusion point DP when the number of regions is an even number, and is a clock point CP when the number of regions is an odd number.

Subsequently, the center point 810 transmits the clock signal to the near-by diffusion points 821, 822, 823 and 824. Generally in FIG. 8 also, a given clock or diffusion point transmits the received clock signal to any of the other clock or diffusion points that has not yet received the clock signal and that is within a maximum distance from that given clock or diffusion point.

Thereafter, the diffusion points 821, 822, 823 and 924 transmit the received clock signal to near-by diffusion points 831, 832, 833 and 834 and near-by clock points 852, 854, 856 and 858. The diffusion points 831, 832, 833 and 834 then transmit the received clock signal to the near-by diffusion points 841 through 848, and the diffusion points 841 through 848 further transmit the received clock signal to the remaining near-by clock points 851, 853, 855 and 857. Such transmissions are illustrated as arrowed lines in FIG. 8, with each arrowed line representing a transmission path such as a metal line for example.

In one embodiment of the present invention, the length of the metal lines representing the transmission paths in FIGS. 7 and 8 are substantially a same predetermined length. In that case, the clock signal is transferred to the loads in symmetric paths for minimizing signal skew. In addition, by using relatively short lengths for the transmission paths and by using a center point for initially applying the master clock signal, power consumption is minimized.

Figure 9:
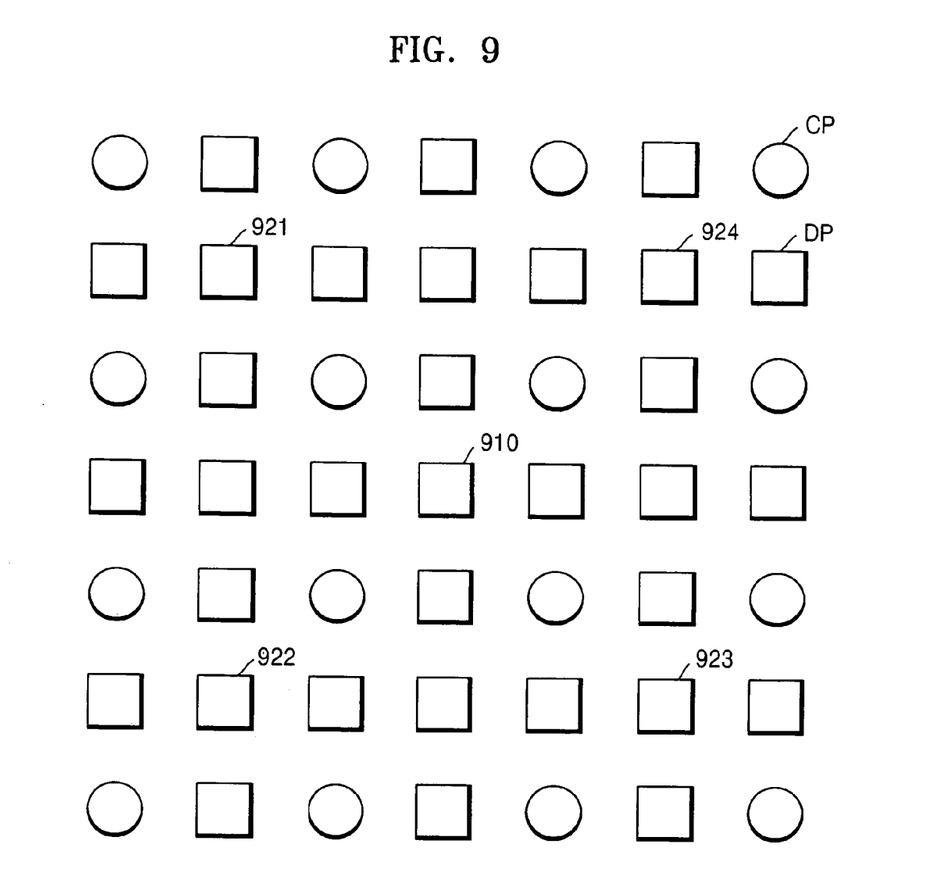
FIG. 9 illustrates a point diffusion signal distribution system for the clock system divided into sixteen regions, according to an embodiment of the present invention.

FIG. 9 shows a point diffusion signal distribution system formed with the clock points for the area of FIG. 6 divided into sixteen regions. Referring to FIG. 9, the master clock signal may be initially applied to the one center diffusion point 910 located at the center of the area in FIG. 9. Alternatively, the area in FIG. 9 is divided into four sub-areas, with each sub-area being divided into respective four regions (similar to FIG. 4). In that case, the master clock signal is initially applied simultaneously to a respective center point in each of the sub-areas. In the example of FIG. 9, the four diffusion points 921, 922, 923 and 924 form center points for the four sub-areas, respectively.

The present invention may further use a design assistant device such as CTS (Clock Tree Synthesis) which is a computer assisted design tool for further optimizing power consumption and signal skew.

Figure 10:
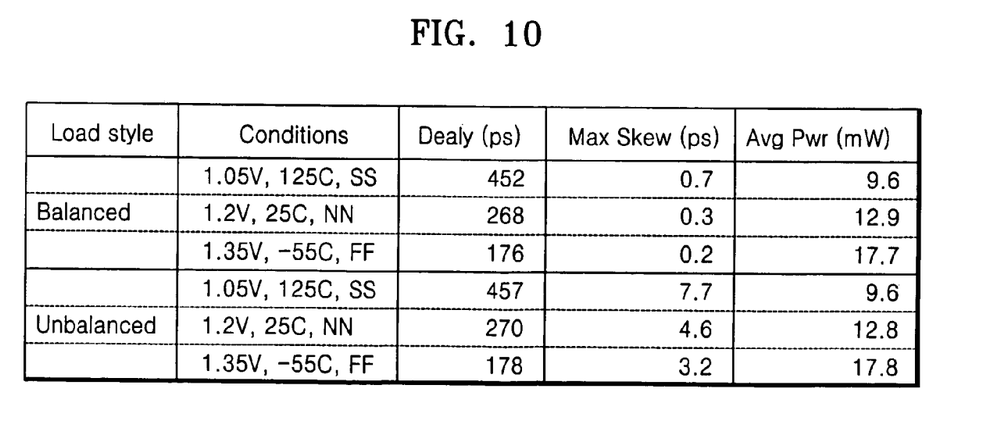
FIG. 10 shows results of computer simulation for a point diffusion clock distribution system according to an embodiment of the present invention.

FIG. 10 shows results of computer simulation of a point diffusion clock distribution system according to an embodiment of the present invention. Referring to FIG. 10, the simulation results are for an area having dimensions of 3600×3600 μm². The gradient of the input clock signal was 150 ps (Pico-seconds), the operating voltage was 1.2V, and the temperature was set to 125° C.

In FIG. 10, the load type distinguishes balanced loads from unbalanced loads. Experiments were performed at a minimum temperature of −55° C. and a maximum temperature of 125° C., based on voltages of 1.05V, 1.2V and 1.35V. Similar results were obtained for the power consumption and delay in both balanced and unbalanced cases. However, there was a large difference in the skew between the balanced and unbalanced cases.

While the present invention has been particularly shown and described with reference to exemplary embodiments thereof, it will be understood by those of ordinary skill in the art that various changes in form and details may be made therein without departing from the spirit and scope of the present invention as defined by the following claims.

For example, any number of elements shown or described herein is by way of example only. Furthermore, the present invention is described for distribution of a clock signal in an area of an integrated circuit. However, the present invention may be applied for distribution of other types of signals in other types of applications as well.

What is claimed is:

1. A method of distributing a signal to loads in an area, comprising:
   dividing the area into a plurality of regions;
   placing a respective signal point in each of the regions for providing the signal to a load in each region;
   placing a respective diffusion point between any two neighboring signal points;
   initially applying the signal to a center point of the signal and diffusion points;
   transmitting the signal when received at a given signal or diffusion point to any of the signal or diffusion points within a maximum distance from the given signal or diffusion point; and
   placing the respective signal point at substantially a center of each region.

2. The method of claim 1, further comprising:
   placing the respective diffusion point substantially at a mid-point between any two neighboring signal points.

3. The method of claim 1, wherein the center point is a diffusion point when the number of regions is an even number.

4. The method of claim 1, further comprising:
   transmitting the signal when received at a given signal or diffusion point to any of the signal or diffusion points having a predetermined same distance from the given signal or diffusion point.

5. The method of claim 1, further comprising:
   dividing the area into a plurality of sub-areas; and
   initially applying the signal to a respective center point of the signal and diffusion points in each of the sub-areas.

6. The method of claim 1, further comprising:
   transmitting the signal when received at a given signal or diffusion point to any of the signal or diffusion points that has not yet received the signal and that is within the maximum distance from the given signal or diffusion point.

7. The method of claim 1, wherein the signal is a clock signal.

8. The method of claim 7, wherein the area is within an integrated circuit for receiving the clock signal.

9. A method of distributing a signal to loads in an area, comprising:
   dividing the area into a plurality of regions;
   placing a respective signal point in each of the regions for providing the signal to a load in each region;
   placing a respective diffusion point between any two neighboring signal points;
   initially applying the signal to a center point of the signal and diffusion points; and
   transmitting the signal when received at a given signal or diffusion point to any of the signal or diffusion points within a maximum distance from the given signal or diffusion point;
   wherein the center point is a signal point when the number of regions is an odd number.

10. A point diffusion signal distribution system for distributing a signal to loads in an area, comprising:
    a plurality of regions comprising the area;
    a plurality of signals points, each signal point being disposed in a respective region for providing the signal to a load in the respective region; and
    a plurality of diffusion points, each diffusion point being disposed between a respective two neighboring signal points;
    wherein the signal is initially applied to a center point of the signal and diffusion points;
    and wherein the signal when received at a given signal or diffusion point is transmitted to any of the signal or diffusion points within a maximum distance from the given signal or diffusion point;
    and wherein each signal point is disposed at substantially a center of the respective region.

11. The point diffusion signal distribution system of claim 10, wherein each diffusion point is disposed substantially at a mid-point between the respective two neighboring signal points.

12. The point diffusion signal distribution system of claim 10, wherein the center point is a diffusion point when the number of regions is an even number.

13. The point diffusion signal distribution system of claim 10, wherein the center point is a signal point when the number of regions is an odd number.

14. The point diffusion signal distribution system of claim 10, wherein the signal when received at a given signal or diffusion point is transmitted to any of the signal or diffusion points having a predetermined same distance from the given signal or diffusion point.

15. The point diffusion signal distribution system of claim 10, wherein the area is divided into a plurality of sub-areas, and wherein the signal is initially applied to a respective center point of the signal and diffusion points in each of the sub-areas.

16. The point diffusion signal distribution system of claim 10, wherein the signal when received at a given signal or diffusion point is transmitted to any of the signal or diffusion points that has not yet received the signal and that is within the maximum distance from the given signal or diffusion point.

17. The point diffusion signal distribution system of claim 10, wherein the signal is a clock signal.

18. The point diffusion signal distribution system of claim 17, wherein the area is within an integrated circuit for receiving the clock signal.

* * * * *